United States Patent [19]

Murphy et al.

[11] Patent Number: 5,348,721
[45] Date of Patent: Sep. 20, 1994

[54] POLYALUMINUMCHLOROSULFATES AND PREPARATION AND USES THEREOF

[75] Inventors: J. D. Murphy; R. Schuffenecker, both of Lyons; H. Suty, Champigny S/Marne, all of France

[73] Assignee: Elf Atochem S.A., Puteaux, France

[21] Appl. No.: 18,959

[22] Filed: Feb. 18, 1993

[30] Foreign Application Priority Data

Feb. 18, 1992 [FR] France ............... 92 01807

[51] Int. Cl.$^5$ .................. C01B 9/00; C01F 7/74; B01D 21/00
[52] U.S. Cl. .................. 423/463; 423/467; 423/556; 210/702
[58] Field of Search ............ 423/556, 463, 467; 210/702

[56] References Cited

U.S. PATENT DOCUMENTS

| | | | |
|---|---|---|---|
| 2,312,198 | 2/1943 | Slagle | 423/467 |
| 4,559,220 | 12/1985 | Kullenberg et al. | 423/556 |
| 4,654,201 | 3/1987 | Carlsson | 423/556 |
| 4,981,673 | 1/1991 | Boutin | 423/556 |
| 5,120,522 | 6/1992 | Dore et al. | 423/556 |
| 5,124,139 | 6/1992 | Colvin et al. | 423/556 |
| 5,149,400 | 9/1992 | Haase et al. | 423/556 |
| 5,246,686 | 9/1993 | Cuer et al. | 423/556 |

FOREIGN PATENT DOCUMENTS

| | | | |
|---|---|---|---|
| 28825/89 | 8/1989 | Australia . | |
| 54-32197 | 9/1993 | Japan | 423/556 |
| 1525082 | 9/1978 | United Kingdom . | |
| 2128977 | 5/1984 | United Kingdom . | |

*Primary Examiner*—Gary P. Straub
*Attorney, Agent, or Firm*—Pennie & Edmonds

[57] ABSTRACT

The invention relates to high basicity polyaluminumchlorosulfates and their preparation process, said polyaluminumchlorosulfates being useful in the treatment of drinking water, aqueous effluents, and in the papermaking industry and having the formula:

$$Al(OH)_a Cl_b (SO_4)_c M_d N_e$$

in which:
  M is an alkaline-earth metal;
  N is an alkaline metal;
  a, b, c, d and e are numbers such that:
    $1.95 < a < 2.4$; $0 < c < 0.15$; $0 < d < 0.16$;
    $0 < e < 1.7$; $a + b + 2c = 3 + 2d + e$.

21 Claims, No Drawings

POLYALUMINUMCHLOROSULFATES AND PREPARATION AND USES THEREOF

BACKGROUND OF THE INVENTION

The present invention relates to high basicity polyaluminumchlorosulfates and their preparation process, and to the application of such polyaluminumchlorosulfates to the treatment of drinking water, aqueous effluents, and in the papermaking industry.

Polyaluminumchlorosulfates are widely used in industry, notably the papermaking industry and in the treatment of their waste water and water intended for drinking, because of elevated coagulating and floculating ability. The performance and applications of these polyaluminumchlorosulfates is of course a function of their main characteristics. For the treatment of water intended for drinking, high basicity is required; for effective floculation, a high sulfate content is required; and for all applications, the compounds need to be stable.

Polyaluminumchlorosulfates the formula of which is $Al_nOH_m(SO_4)_kCl_{3n-m-2k}$ have a relatively high basicity, which can reach 65%. These products, described in FR-A-2 584 699, nevertheless suffer from the major disadvantage of leading to the production of gypsum as a by-product during their manufacture, the discharge of which presents environmental problems.

JP-52 113,384 describes and claims a process for producing high basicity polyaluminumchlorosulfates by adding, at a temperature less than 60° C., an alkaline agent such as $CaCO_3$, $NaHCO_3$, $Na_2CO_3$, $Mg(OH)_2$ or MgO to a solution of a polyaluminum compound previously obtained by reacting a low basicity polyaluminumchlorosulfate with $CaCO_3$, leading to the production of gypsum which is separated out, the basicity of this intermediate polyaluminum compound being 50.

JP-53 001,699 describes and claims a process for producing high basicity polyaluminumchlorosulfate in which, in a first stage, a medium basicity polyaluminumchlorosulfate is reacted with an equimolar, based on the sulfate, amount of $CaCO_3$, leading to the production of gypsum which is separated out, after which, in a second stage, the product from the preceding stage having a basicity comprised between 55 and 58, is reacted with a compound selected from the group comprising: $CaCO_3$, $NaHCO_3$, $Na_2CO_3$, $Mg(OH)_2$ and MgO.

Nevertheless, the basicity of the polyaluminumchlorosulfates according to these two Japanese documents above is less than 70% and hence, in certain applications, is not sufficiently high. Moreover, these compounds have poor stability. One major disadvantage that these compounds suffer from is the production of gypsum the discharge of which presents an environmental problem, as mentioned previously.

FR-A-2 317,227 describes and claims a process for producing, at a temperature less than 50° C., aluminum hydroxychlorides of general formula:

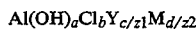

in which:
Y is an anion of valency z1, typically $SO_4^{2-}$;
M is a cation of valency z2, such as ammonium, an alkaline or alkaline-earth metal; and
$1.2 < a < 1.7$;
$0 < c \leq 0.6$;
$0.2 < d < 1.7$; and
$a+b+c=3+d$.

However, in this patent it is stated that even though the use of alkaline-earth metals is possible, the danger of precipitates appearing does exist, leading to poor stability.

SUMMARY OF THE INVENTION

None of the above documents describes or suggests the present invention which provides polyaluminumchlorosulfates having improved characteristics, notably as regards eliminating turbidity or cloudiness, floculation ability, residual aluminum content, stability, and which do not give rise to waste products during manufacture, all these advantages being obtained simultaneously.

The present invention hence provides a high basicity water-soluble polyaluminumchlorosulfate, having a content of aluminum as $Al_{13}$ of at least 1 mol %, the aluminum concentration being 0.01M, and having the formula:

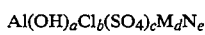

in which:
M is an alkaline-earth metal;
N is an alkaline metal;
a, b, c, d and e are numbers such that:
$1.95 < a < 2.4$; $0 < c < 0.15$; $0 < d < 0.16$;
$0 < e < 1.7$; $a+b+2c=3+2d+e$.

The numbers a, b, c, d and e are such that the improved properties, such as basicity and stability specific to the novel polychlorosulfates according to the invention, are obtained.

The alkaline-earth metal M is, for example, magnesium or calcium. Preferably M is calcium. The alkaline metal N is, for example, sodium or potassium. Preferably, N is sodium.

In accordance with a preferred embodiment, the polyaluminumchlorosulfate is of the formula:

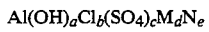

in which:
$2.05 < a < 2.25$; $0.04 < c < 0.06$;
$0.1 < d < 0.13$; $0.4 < e < 0.8$.

The basicity of the present polyaluminumchlorosulfates is very high; according to an embodiment of the present invention, the basicity is higher than 67%, preferably higher than 72%.

The particular form under which the aluminum exists, i.e. $Al_{13}$, can be noticed through $Al^{27}$ NMR analysis, under the operating conditions given in the following examples. Pouillot and al., January 1992, conference in Hong-Kong, "High Basicity Polymeric Aluminum Salts for Drinking Water Production", discloses the occurrence of this particular form $Al_{13}$, and teaches the link between the presence of $Al_{13}$ and the excellent properties of the product. There is however neither mention of the compounds according to the present invention, nor quantitative values regarding $Al_{13}$.

According to a preferred embodiment of the present invention, the content of aluminum as $Al_{13}$ is higher than 1 mol % for an Al concentration of 0.06M, and/or higher than 3 mol % for an Al concentration of 0.01M.

The presence of $A_{13}$ allows the polyaluminumchlorosulfates according to the present invention to be endowed with excellent properties, such as stability for at least 1 month at 45° C.

The preparation of these novel polyaluminumchlorosulfates is made possible by the process as provided by the present invention.

Thus, the invention provides a process for preparing a high basicity water-soluble polyaluminumchlorosulfate, having a content of aluminum as $Al_{13}$ of at least 1 mol %, the aluminum concentration being 0.01%, and having the formula:

$$Al(OH)_a Cl_b (SO_4)_c M_d N_e$$

in which:
M is an alkaline-earth metal;
N is an alkaline metal;
a, b, c, d and e are numbers such that:
$1.95 < a < 2.4; 0 < c < 0.15; 0 < d < 0.16;$
$0 < e < 1.7; a + b + 2c = 3 + 2d + e;$
comprising reacting, at a temperature of 50° to 70° C. an alkaline-earth metal compound M and an alkaline metal compound N with an polyaluminumchlorosulfate of formula:

$$Al(OH)_{a'} Cl_{b'} (SO_4)_{c'}$$

in which:
$1 < a' < 1.95; 0 < c' < 0.15;$
$a' + b' + 2c' = 3;$
in the following proportion, calculated in molecular equivalents:

$$0 < M/Al < 0.16 \text{ and } 0 < N/Al < 1.7.$$

In a preferred embodiment, the temperature is comprised between 60° and 65° C.

The expression "alkaline-earth metal compound" refers to any derivative having a basic nature of said metal, particularly an oxide, hydroxide and (bi)carbonate.

Preferably, the alkaline-earth metal compound is a calcium compound, advantageously $Ca(OH)_2$ and/or $CaCO_3$. The expression "alkaline metal compound" refers to any derivative, having a basic nature, of said metal, particularly an oxide, hydroxide and (bi)carbonate. Preferably, the alkaline metal compound is a sodium compound, advantageously $Na_2CO_3$.

The expression "calculated as molar equivalent" means that all ratios are expressed in moles, reduced to the metal form.

In a preferred embodiment, the numbers a' and c', and the proportions M/Al and N/Al are respectively comprised in the ranges:
$1.1 < a' < 1.4; 0.04 < c' < 0.06;$ and
$0.1 < M/Al < 0.13$ and $0.4 < N/Al < 0.8.$ The polyaluminumchlorosulfate used as a starting material can be any polyaluminumchlorosulfate that corresponds to the above formula $Al(OH)_{a'} Cl_{b'} (SO_4)_{c'}$, in other words of low to medium basicity, typically of the order of 40 to 50%.

One preferred polyaluminumchlorosulfate is that one which is obtained by the process that comprises reacting basic aluminum chloride with basic aluminium sulfate, both previously heated, at a temperature comprised between 80° and 120° C., the relative proportions of the constituents being chosen whereby polyaluminumchlorosulfate of the above-mentioned formula $Al(OH)_a Cl_b (SO_4)_c$, is obtained. This process is described in detail in FR-A-2 534 897, incorporated herein by reference.

Another preferred polyaluminumchlorosulfate is obtained by the process that comprises reacting basic aluminum chloride with sulfuric acid at a temperature comprised between 60° and 120° C., the relative proportions of the constituents being chosen whereby polyaluminumchlorosulfate of the formula $Al(OH)_a Cl_b (SO_4)_c$, above is obtained. This process is described in detail in FR-A-2 036 685, incorporated herein by reference.

The polyaluminumchlorosulfates according to the present invention are useful in numerous areas, such as those cited in the introduction to this specification. Thus, the present invention also covers the applications of the present polyaluminumchlorosulfates, notably in the treatment of water for drinking, and of aqueous effluent, as well as in the papermaking industry.

In current applications, various problems used in fact to arise, resulting from the manufacturing process. To eliminate cloudiness, which is directly linked to coagulation-flocculation, it is necessary to use a high sulfate content, and a low temperature for conversion to the base form, typically less than 40° C. Treatment of water intended for drinking requires a low residual aluminum content, and this implies high basicity and a consequently high temperature for conversion to the base form, typically higher than 70° C. There is hence incompatibility between the characteristics for the two applications, regarding the influence of temperature. Moreover, an polyaluminumchlorosulfate having a high sulfate content and obtained at a high temperature for conversion to the base form is subject to gelling or precipitation; it consequently does not have sufficient stability over time, as required in order to store it. Up until now, improvement in one characteristic was obtained at the expense of deterioration of other characteristics. The present invention hence enables the disadvantages of the prior art to be overcome, and offers numerous advantages which will become clear from the description and examples which follow.

DETAILED DESCRIPTION AND EXAMPLES

EXAMPLE 1 a) Preparation of polyaluminumchlorosulfate starting material

Synthesis of the basic aluminum chloride is carried out in a 4 litre autoclave, stirred at a controlled speed and heated by circulating a heat-transfer fluid inside the double-walled casing. The reactor is additionally fitted with a manometer, a thermometric jacket, a vent and a disc able to rupture under excess pressure. Operating conditions of the reaction and conversion to basic form comprise a temperature of 140° C. and a pressure of 2 bars, for respective durations of 4 and 3.5 hours. The basic aluminum sulfate is synthesized in a 1 litre glass reactor, stirred at a controlled speed and heated by circulation of a heat-carrying fluid in the double-walled casing; the reactor is fitted with a thermometric jacket, a cooled vent and a reagent introduction point. The reaction stage is carried out at a temperature of about 110° C. and under atmospheric pressure, for a duration of 2 hours. The above two suspensions are mixed in a 5 liter glass reactor with stirring, for 20 minutes at 100° C. The resulting suspension is filtered under a pressure of 3 bars in order to remove excess alumina. The polyaluminumchlorosulfate obtained has the following formula:

$$Al(OH)_{1.23}Cl_{1.65}(SO_4)_{0.06}$$

of basicity B of about 40%.

b) Preparation of high basicity polyaluminumchlorosulfate according to the invention 1 kg of polyaluminumchlorosulfate prepared previously with an alumina content of 10.5% is introduced into a double-walled 1 litre reactor fitted with a stirring device and counter-blade. The reactor temperature is controlled by circulating water through a thermostatic bath in the double casing. The temperature is brought to 60° C. 20 g of Ca(OH)$_2$ are added and the suspension was stirred for 30 minutes. Following this, 85 g Na$_2$CO$_3$ are slowly added over a 30 minute period. The suspension is then stirred for a total of 1 hour, at a temperature of 60° C. The suspension containing only a small amount of solid is finally filtered.

Its final composition, by weight, is as follows:

| Al$_2$O$_3$ | approx. | 9.69% |
|---|---|---|
| Ca | " | 1.03% |
| Na | " | 3.40% |
| Cl | " | 11.41% |
| SO$_4$ | " | 1.15% |
| basicity | " | 74.38% | meaning that the final polyaluminumchlorosulfate has the formula below:

$$Al(OH)_{2.23}Cl_{1.69}(SO_4)_{0.06}Ca_{0.13}Na_{0.78}$$

EXAMPLE 2

The procedure in example 1 is repeated, except for the fact that the mixing temperature of the alkaline-earth and alkaline metal compounds and the polyaluminumchlorosulfate is 70° C.

The final product has the following composition, by weight:

| Al$_2$O$_3$ | approx. | 9.64% |
|---|---|---|
| Ca | " | 1.0% |
| Na | " | 3.3% |
| Cl | " | 11.47% |
| SO$_4$ | " | 1.12% |
| basicity | " | 73.04% | meaning that the final polyaluminumchlorosulfate has the formula below:

$$Al(OH)_{2.19}Cl_{1.71}(SO_4)_{0.06}Ca_{0.13}Na_{0.76}$$

EXAMPLE 3 (comparative example)

The procedure in example 2 is repeated except for the fact that 50 g of Na$_2$CO$_3$ are introduced, instead of 85 g.

The composition of the final product is, by weight:

| Al$_2$O$_3$ | approx. | 10.0% |
|---|---|---|
| Ca | " | 1.06% |
| Na | " | 1.42% |
| Cl | " | 11.47% |
| SO$_4$ | " | 1.15% |
| basicity | " | 60.7% | meaning that the final polyaluminumchlorosulfate has the formula below:

$$Al(OH)_{1.80}Cl_{1.65}(SO_4)_{0.06}Ca_{0.13}Na_{0.31}$$

EXAMPLE 4

The procedure in example 1 is repeated except that 27 g of CaCO$_3$ are added instead of 20 g of Ca(OH)$_2$.

The composition of the final product is, by weight:

| Al$_2$O$_3$ | approx. | 9.90% |
|---|---|---|
| Ca | " | 1.06% |
| Na | " | 3.21% |
| Cl | " | 11.81% |
| SO$_4$ | " | 1.22% |
| basicity | " | 71.6% | meaning that the final polyaluminumchlorosulfate has the formula below:

$$Al(OH)_{2.15}Cl_{1.71}(SO_4)_{0.07}Ca_{0.14}Na_{0.72}$$

EXAMPLE 5 (comparative example)

The procedure in example 4 is repeated, except for the fact that the mixing temperature of the alkaline-earth and alkaline metals is 40° C.

The composition of the final product is, by weight:

| Al$_2$O$_3$ | approx. | 9.34% |
|---|---|---|
| Ca | " | 0.93% |
| Na | " | 3.40% |
| Cl | " | 11.25% |
| SO$_4$ | " | 1.12% |
| basicity | " | 73.67% | meaning that the final polyaluminumchlorosulfate has the formula below:

$$Al(OH)_{2.21}Cl_{1.73}(SO_4)_{0.065}Ca_{0.13}Na_{0.81}$$

EXAMPLE 6

The starting polyaluminumchlorosulfate material was obtained as described in example 1, except for the fact that the basic aluminum sulfate was replaced by 60% sulphuric acid, added at a temperature comprised between 50° C. and 120° C.

The polyaluminumchlorosulfate obtained had the following formula:

$$Al(OH)_{1.12}Cl_{1.76}(SO_4)_{0.06}$$

Preparation of the product according to the invention is carried out starting from 1 kg of the polyaluminumchlorosulfate prepared above, having an alumina content of 9%. The procedure in example 1 is repeated except that 17 g of Ca(OH)$_2$ instead of 20 g is added, and 62 g of Na$_2$CO$_3$ is added instead of 85 g.

The composition of the final product is, by weight:

| Al$_2$O$_3$ | approx. | 8.43% |
|---|---|---|

| | | |
|---|---|---|
| Ca | " | 0.88% |
| Na | " | 2.49% |
| Cl | " | 10.34% |
| SO$_4$ | " | 0.92% |
| basicity | " | 68% | meaning that the final polyaluminumchlorosulfate has the formula below:

$$Al(OH)_{2.03}Cl_{1.76}(SO_4)_{0.06}Ca_{0.13}Na_{0.65}$$

EXAMPLE 7 (control)

The polyaluminumchlorosulfate employed in this example is a product prepared according to the process used in the second preparation of FR 2 036 685. Its composition is, by weight:

| | | |
|---|---|---|
| Al$_2$O$_3$ | approx. | 10.2% |
| Ca | " | 0.47% |
| Cl | " | 9.10% |
| SO$_4$ | " | 2.30% |
| basicity | " | 53.35% |

Its formula is:

$$Al(OH)_{1.6}Cl_{1.28}(SO_4)_{0.12}Ca_{0.06}$$

Tests are carried out on the practical application of these products, providing the results given in the table.

Elimination of turbidity (residual NTU) is representative of the effectiveness of flocculation. The test is carried out using water from the river Seine at a pH of 8.50 to 8.69, at 21° C. The results are given as percentage improvement over the control (*).

The residual aluminum contents are expressed in ppb (μg/l) as percentage improvement over the control (*).
Stability is estimated visually.

| Example No. | Basicity | Elimination of turbidity* (residual NTU) | residual Al* | Stability |
|---|---|---|---|---|
| 1 | 74.38 | −24% | −41% | 1 month at 45° C. |
| 2 | 73.04 | 0 | −71% | 1 month at 45° C. |
| 3 | 60.7 | +51.5% | −27.5% | 1 day |
| 4 | 74.6 | +7% | −40% | 1 month at 45° C. |
| 5 | 73.67 | +54% | −20% | gelled |
| 6 | 68.0 | −32% | −45% | 1 month at 45° C. |
| 7 | 53.35 | 0 | 0 | 1 month at 45° C. |

The results show that the product prepared in examples 3 and 5, which are not part of the invention because of their too low basicity (example 3—65%) or a too low reaction temperature (example 5—40° C.), are much less effective as regards their application properties listed in the table, and are less stable.

EXAMPLE 8

A polyaluminumchlorosulfate is prepared as follows. Sulfuric acid is made to react with basic aluminum chloride, such as obtained in example 1, step a), at a temperature comprised between 60° and 120° C., in order to obtain a suitable starting polyaluminumchlorosulfate. This latter is treated similarly to example 1, step b).

Its final composition is, by weight:

| | | |
|---|---|---|
| AL$_2$O$_3$ | approx. | 7.73% |
| Ca | approx. | 0.8% |
| Na | approx. | 2.23% |
| Cl | approx. | 9.4% |
| SO$_4$ | env. | 0.86% |
| basicity | env. | 67.7% | meaning that the final polyaluminumchlorosulfate has the formula below:

$$Al(OH)_{1.78}Cl_{1.39}(SO_4)_{0.04}Ca_{0.10}Na_{0.51}$$

This aluminum salt is designated as S 23.

EXAMPLES 9, 10 et 11

The procedure in example 1 is repeated and, by adjusting the amounts of the starting compounds, one obtains the following polyaluminumchlorosulfates, referred to by their reference:

—ZPC 19C

| | | |
|---|---|---|
| Al$_2$O$_3$ | approx. | 10.3% |
| Ca | approx. | 1.05% |
| Na | approx. | 3.45% |
| Cl | approx. | 12% |
| SO$_4$ | approx. | 1.19% |
| basicity | approx. | 74.5% |

—ZPC 20B

| | | |
|---|---|---|
| Al$_2$O$_3$ | approx. | 9.02% |
| Ca | approx. | 0.96% |
| Na | approx. | 3.05% |
| Cl | approx. | 10% |
| SO$_4$ | approx. | 1.04% |
| basicity | approx. | 75.3% |

—ZPC 21C

| | | |
|---|---|---|
| Al$_2$O$_3$ | approx. | 10.1% |
| Ca | approx. | 1.07% |
| Na | approx. | 3.35% |
| Cl | approx. | 12% |
| SO$_4$ | approx. | 1.21% |
| basicity | approx. | 73.7% |

An analysis is carried out, to determine the content of aluminum Al$_{13}$. The analysis is carried out using Al$^{27}$ NMR, i.e. by seeking acquisition parameters and determining the 90° pulse. The operating conditions are the following:

| | |
|---|---|
| Reference solution | AlCl$_3$ 0.5M |
| tuning: 9966.5 | probe tuning |
| matching: 970 | probe tuning |
| SF: 52.147 MHz | resonant frequency for Al |
| SW: 15625 Hz | observed frequency range corresponding to range 150 to −150 ppm on the basis of AlCl$_3$ (0 ppm) |
| QI: 1361 Hz | carrier frequency |
| SI = TD = 8K | FID and spectra size (in Kwords) |
| QN = AP | type of detection |
| PW = 11 μs | pulse duration (PW 90° = 13) |
| RD = 1 s | interval between pulses |

The results are summarized in the table below.

EXAMPLE 12 (comparison)

The product according to this example is a commercially available product, WAC HB® PB (from Elf Atochem S.A.). Its composition is the following, by weight:

| | | |
|---|---|---|
| $Al_2O_3$ | approx. | 8.48% |
| Ca | approx. | 1.2% |
| Na | approx. | 0.013% |
| Cl | approx. | 6.1% |
| $SO_4$ | approx. | 1.44% |
| basicity | approx. | 71.7% |

This product is the one which was the subject of a test, as depicted in Pouillot and al., p. 20-21. In this article, there is mention of the presence of the $Al_{13}$ form with strong dilution of the WAC HB®, i.e. a very low Al concentration. This article establishes the link between the presence of $Al_{13}$ and the useful properties of this product. This product WAC HB® has a $Al_{13}$ content of 3.4 mol % for an Al concentration of 0.012M, after a duration of ageing of 8 days. However, for Al concentrations of 0.01M without ageing and 0.06M, no trace of $Al_{13}$ can be detected.

| | | Molar proportion of Al in $Al_{13}$ form as a function of Al concentration | | | | |
|---|---|---|---|---|---|---|
| Ex. | Product | Undiluted 1.5M Al | 1/5 dilution 0.3M Al | 1/10 Dilution 0.15M Al | 1/25 Dilution 0.06M Al | 1/125 Dilution 0.012M Al |
| 8 | S23 (1 month*) | N.D. | N.D. | <1% | 1.4% | 3.2% |
| 8 | S23 (6 month*) | N.D. | <1% | 1.7% | 1.6% | 3.2% |
| 9 | ZPC 19C | N.D. | <1% | N.A. | 2.2% | N.A. |
| 10 | ZPC 20B | N.D. | <1% | 1.1% | 3.1% | 3% |
| 11 | ZPC 21C | N.D. | N.A. | N.A. | 1.2% | N.A. |

N.A. = not analysed
N.D. = not determined
*= duration of ageing

What is claimed is:

1. High basicity water-soluble polyaluminumchlorosulfate, yielding a content of polymeric aluminum as $Al_{13}$ of at least 1 mol % when said polyaluminumchlorosulfate is dissolved in water to form a solution which has an aluminum concentration of 0.01M and having the formula:

$$Al(OH)_a Cl_b (SO_4)_c M_d N_e$$

in which:
M is an alkaline-earth metal;
N is an alkali metal;
a, b, c, d and e are numbers such that:
$1.95 < a < 2.4$; $0 < c < 0.15$; $0 < d < 0.16$;
$0.4 < e < 1.7$; and $a + b + 2c = 3 + 2d + e$.

2. Polyaluminumchlorosulfate according to claim 1, in which M is calcium.

3. Polyaluminumchlorosulfate according to claim 1, in which N is sodium.

4. Polyaluminumchlorosulfate according to one of claims 1 to 3, in which:
$2.05 < a < 2.25$; $0.04 < c < 0.06$; $0.1 < d < 0.13$; $0.4 < e < 0.8$.

5. Polyaluminumchlorosulfate according to claim 4, having a basicity higher than 67%.

6. Polyaluminiumchlorsulfate according to claim 5 having a basicity higher that 72%.

7. Polyaluminumchlorosulfate according to claim 1, having a basicity higher than 67%.

8. Polyaluminumchlorosulfate according to claim 1, having a content of aluminum as $Al_{13}$ higher than 1 mol % for an Al concentration of 0.06M.

9. Polyaluminumchlorosulfate according to claim 1, yielding a content of polymeric aluminum as $Al_{13}$ of at least 3 mol % when said polyaluminimchlorosulfate is dissolved in water to form a solution which has an aluminum concentration of 0.01M.

10. Polyaluminumchlorosulfate according to claim 1, having a basicity of higher than 72%.

11. A process for prepartin a high basicity water-soluble polyaluminumchlorosulfate, yielding a content of polymeric aluminum as $Al_{13}$ of at least 1 mol % when said polyaluminimchlorosulfate is dissolved in water to form a solution which has an aluminum concentration of 0.01M and having the formula:

$$Al(OH)_a Cl_b (SO_4)_c M_d N_e$$

in which:
M is an alkaline-earth metal;
N is an alkali metal;
a, b, c, d and e are numbers such that:
$1.95 < a < 2.4$; $0 < c < 0.15$; $0 < d < 0.16$;
$0.4 < e < 1.7$; and $a + b + 2c = 3 + 2d + e$;
comprising reacting, at a temperature of 50° to 70 ° C. an alkaline-earth metal compound M and an alkali metal compound N with a polyaluminumchlorosulfate of the formula:

$$Al(OH)_{a'} Cl_{b'} (SO_4)_{c'}$$

in which:
$1 < a' < 1.95$; $0 < c' < 0.15$;
$a' + b' + 2c' = 3$;
in the following proportion, calculated in molecular equivalents:
$0 < M/Al < 0.16$ and $0.4 < N/Al < 1.7$.

12. A process according to claim 11, in which the temperature is between 60° and 65° C.

13. A process according to claim 11, in which the alkaline-earth metal compound is a calcium compound.

14. A process according to claim 13 in which the calcium compound is selected form the group consisting of $Ca(OH)_2$, $CaCO_3$ and mixtures thereof.

15. A process according to claim 11, in which the alkali metal is a sodium compound.

16. A process according to claim 15 in which the sodium compound is $Na_2CO_3$.

17. A process according to claim 11, in which:
$1.1 < a' < 1.4$; $0.04 < c' < 0.06$; and $0.1 < M/Al < 0.13$ and $0.4 < N/Al < 0.8$.

18. A process according to one of claims 11 to 17, in which the polyaluminumchlorosulfate of formula Al(OH)$_a$,Cl$_b$,(SO$_4$)$_c$, is obtained by the process that comprises reacting basic aluminum chloride with basic aluminium sulfate, both previously heated, at a temperature between 80° and 120° C., the relative proportions of the constituents being chosen so that polyaluminumchlorosulfate of the abovementioned formula Al(OH)$_a$,Cl$_b$,(SO$_4$)$_c$, is obtained.

19. A process according to one of claims 11 to 17, in which the polyaluminumchlorosulfate of formula Al(OH)$_a$,Cl$_b$,(SO$_4$)$_c$, is obtained by the process that comprises reacting basic aluminum chloride with sulfuric acid at a temperature between 60° and 120° C., the relative proportions of the constituents being chosen so that polyaluminumchlorosulfate of the formula Al(OH)$_a$,Cl$_b$,(SO$_4$)$_c$, above is obtained.

20. A method of coagulating and flocculating impurities in papermaking effluent that comprises contacting said effluent with a polyaluminumchlorosulfate as defined in one of claims 1 to 12.

21. A method of rendering water potable that comprises coagulating and flocculating impurities in water intended for drinking with a polyaluminumchlorosulfate as defined in one of claims 1 to 12 and subsequently separating the water from said coagulated and flocculated impurities.

* * * * *